Figure 1:
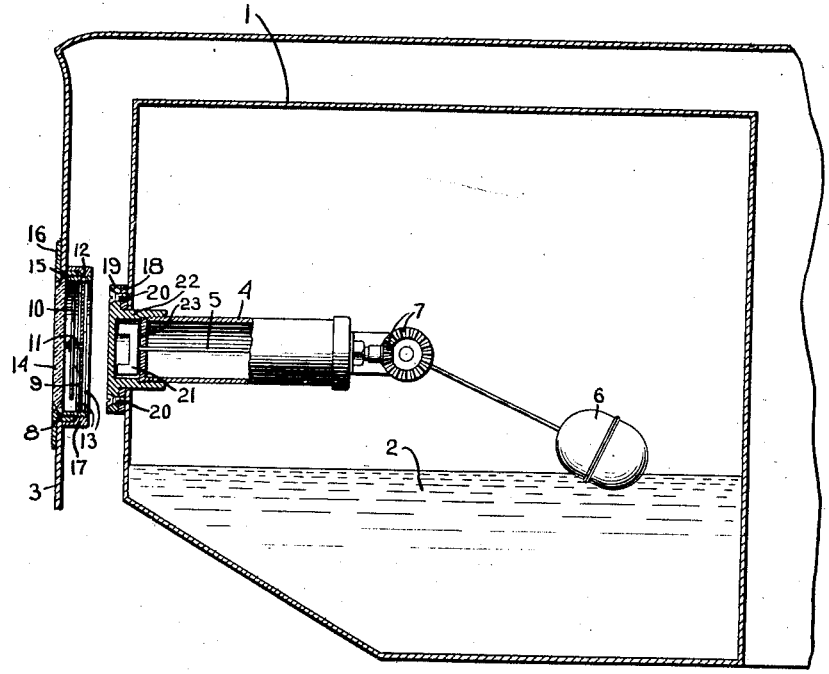

W. C. KNIGHT.
FLUID GAGE.
APPLICATION FILED NOV. 5, 1914.

1,202,854.      Patented Oct. 31, 1916.

Witnesses.

Inventor
William C. Knight
by Heard Smith & Tennant.
Att'ys

UNITED STATES PATENT OFFICE.

WILLIAM C. KNIGHT, OF HIGHLAND PARK, MICHIGAN.

FLUID-GAGE.

1,202,854.  Specification of Letters Patent.  Patented Oct. 31, 1916.

Application filed November 5, 1914. Serial No. 870,382.

*To all whom it may concern:*

Be it known that I, WILLIAM C. KNIGHT, a citizen of the United States, residing at Highland Park, county of Wayne, State of Michigan, have invented an Improvement in Fluid-Gages, of which the following description, in connection with the accompanying drawing, is a specification, like characters on the drawings representing like parts.

This invention relates to fluid gages for indicating the liquid level in a tank and particularly to gages of that type involving a head carrying an indicating pointer and a body portion carrying float-actuated mechanism by which the pointer is controlled. Gages of this sort are used for a variety of purposes, among others being that of indicating the level of gasolene in the gasolene tank of an automobile. In many types of automobiles the tank is arranged adjacent the dash-board, cowl-board or instrument-board and it is desirable that the gage should be so mounted that the head thereof carrying the indicating pointer shall be visible through the cowl-board. In the manufacture of automobiles of this type the tanks are made up with a gage-receiving opening and the cowl-board is made with an opening to receive the head of the gage, and these openings are supposed to be so positioned relative to each other that when the tank is placed in position in the automobile, its gage-receiving opening will be in alinement with the gage opening of the cowl-board so that the head of the gage which is mounted in the tank will occupy the gage opening in the cowl-board. It frequently happens, however, that when the parts are assembled the gage-receiving opening in the tank and the gage opening in the cowl-board are found to be somewhat out of alinement, thus making it very difficult, if not impossible, to place the gage in the tank and have the head thereof occupy the gage-receiving opening in the cowl-board. In order to obviate this difficulty, I have provided a novel fluid gage in which the head carrying the indicating pointer is separate and independent from the body carrying the float-actuated means for controlling the indicating pointer and in which the independent head is designed to be supported independently of the body of the gage. With this construction it is possible to place the gage in the gage-receiving opening in the tank and then to secure the head of the gage with the indicating pointer independently to the cowl-board and yet have an operative gage, even though the openings are not in exact alinement.

In order to give an understanding of the invention I have shown in the drawings some embodiments thereof which are especially designed for use as gasolene gages for automobiles, but I desire to state that the invention is not limited to gages of this type, but is equally applicable for gaging the level of any liquid in any container where it is desirable to have the head of the gage mounted and supported independently from the body thereof.

Figure 2:
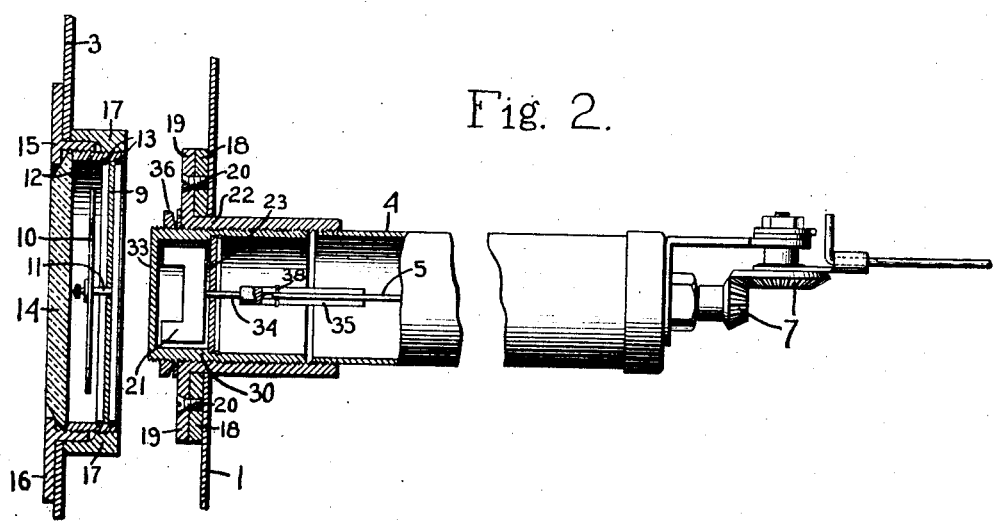

Figure 1 of the drawings shows in section a gage embodying my invention; Fig. 2 is a fragmentary sectional view of a gage also embodying my invention but having an adjustment to provide for adjusting the body and head relative to each other.

I have shown at 1 a tank containing liquid 2 which for the sake of illustration may be assumed to be the gasolene tank of an automobile. I have shown at 3 the dash-board, cowl-board or instrument-board of an automobile which is situated closely adjacent one end of the tank, this being a more or less common way of mounting gasolene tanks in some types of automobiles.

My improved gage is of that type which is mounted in the side of the tank 1 and is designed to be visible through the cowl-board 3. The gage herein illustrated is a float-operated gage, it comprising a body portion 4 in which is journaled a shaft 5 that is operated from a float 6 through suitable bevel gears 7. A gage of this type is illustrated and described in an application filed by Carl W. Stahle, Se. No. 847,521, filed June 26, 1914. The complete gage comprises a head carrying an indicating pointer, the position of which is controlled by the shaft 5 so that as the float 6 rises and falls the indicating pointer will give indication of such fact.

In my invention I make the head carrying the indicating pointer separate and independent from the body 4 of the gage so that the head can be independently mounted, the gage having such a construction that notwithstanding the independence of the head the position of the indicating pointer will be controlled by the shaft 5. The head of the gage is shown generally at 8 and it comprises a supporting member carrying a dial 9 and an indicating pointer 10 which is pivotally mounted on a pivot pin 11 and moves over the dial to indicate the liquid level in the tank. While the head may have any suitable construction provided it includes the dial and the indicating pointer, I have herein illustrated a construction which includes a ring 12 into which the dial 9 is set, said dial being held in place by any suitable means, such as the spring rings 13. The dial is shown as carrying the pivot post 11 on which the indicating pointer 10 is pivotally mounted. The pointer is covered by a glass disk 14 which is held in place against the end of the member 12 by means of a screw bezel 15. The head carrying the indicating pointer is designed to be mounted directly on the cowl-board 3 while the gage 4 is mounted on the tank 1. The head of the indicator can be secured in place on the cowl-board by any suitable means. As shown in the drawings the bezel 15 is provided with the flange 16 to overlie the cowl-board 3, and a locking ring 17 is provided which screws onto the ring 12 and clamps the head onto the cowl-board.

The gage body can be mounted in the tank 1 in any suitable way. One convenient way is herein illustrated wherein the tank has soldered or otherwise secured thereto a flange or ring 18 and the gage body is provided with a flange 19 which overlies the ring 18 and is secured thereto by screws 20.

The gage also includes means by which the rotation of the shaft 5 as controlled by the float 6 is communicated to the indicating pointer 10, and while any suitable connection between the shaft 5 and pointer 10 may be employed which will permit of the independent mounting of the head, I will preferably use a construction in which the pointer 10 is controlled magnetically. For this purpose I propose to mount on the shaft 5 a magnet 21 and to make the indicating needle 10 in the form of a magnetic needle so that the needle 10 will follow the magnet 21 in its movements. In the construction shown in Fig. 1 the flange 19 of the gage body is formed on a separate member 22 into which the end of the tube 4 is screw-threaded, said tube 4 carrying at its end a bearing member 23 in which the shaft 5 has bearing. The member 22 is cup-shaped and the magnet 21 is situated between the end of the member 22 and the bearing member 23. By means of this construction a perfectly tight joint can be made which will prevent the possibility of the escape of any gasolene even when the tank is full.

In Fig. 2 I have shown another embodiment of my invention wherein the indicator-actuating mechanism carried by the body is adjustable so as to permit of its being adjusted toward and from the head. In a gage of this nature it is desirable that the magnet should be close enough to the magnetic needle 10 so that it will effectively control the movement of the needle. In the building of an automobile it sometimes happens that when the parts are assembled the wall of the tank 1 is spaced so far from the cowl-board 3 that the magnetic influence of the magnet on the needle 10 will be comparatively weak. The construction shown in Fig. 2 provides a device by which the magnet end of the needle-controlling mechanism can be adjusted toward and from the head so as to bring the magnet within effective range of the needle 10 after the head is mounted on the cowl-board. I secure this end by providing the body-supporting member 22 into which the tubular body is screwed with an adjustable magnet-sustaining member 30 which is shown as a cup-shaped member screw-threaded into the supporting member 22. This cup-shaped member is provided with a bearing 23 in which the end of the shaft 5 is mounted, and the magnet 21 is sustained between the bearing member 23 and the end 33 of the adjustable member 30. In order to permit the member 30 to be adjusted without affecting the connection between the shaft 5 and the magnet, I propose to make the shaft telescopic. This telescopic feature may be provided for in various ways, but as shown herein the shaft 5 is made in two sections, one of which is connected to the gear 7 and telescopes into the other section 34 which is secured to the magnet and is journaled in the bearing member 23. This member 34 is provided with opposed slots 35 extending longitudinally thereof in which a cross pin 38 on the main shaft section operates. This provides for adjusting the member 30 relative to the supporting member 22 and maintaining an operative connection between the gears 7 and the magnet in all adjusted positions of the member 30. With this construction the gage may be mounted in the tank 1 and the gage head may be secured to the support 3, and if after mounting these parts it is found that the distance between the magnet and the needle 10 is so great as to unduly weaken the magnetic effect of the magnet 21 on the needle 10, the adjustable member 30 may be adjusted in the member 22 toward the head. The member 30 is held in its adjusted position by a lock nut 36.

One of the principal advantages of the above construction wherein the head is independent from the body of the gage and is independently mounted is that the two parts of the gage can be secured independently to the tank and supporting member 3, respectively, and the gage will be operative even though the apertures through the tank and supporting member 3 in which the two parts of the gage are secured do not come exactly in alinement with each other. Moreover by means of this construction it is possible to remove the tank 1 if it becomes defective with the body of the gage thereon and to substitute a new tank therefor without disturbing the head of the gage which is secured to the supporting member 3.

While in order to give an understanding of the invention I have illustrated and described it as it might be applied to a gasolene tank for an automobile, yet I desire to state that the invention is not confined in its use to gasolene tanks, but is capable of use in any location where it is desirable for any reason to support the head of the gage independently from the body thereof. Moreover this principle of a head independent from the body of the gage and independently supported can be applied to gages of other types than that herein illustrated. Therefore, I do not wish to limit the invention to the exact type of gage herein shown, nor to the construction shown, as various changes in structure might be made without sacrificing the principle of the invention.

I claim:

1. The combination with a gasolene tank of an automobile, of a cowl-board or instrument-board separated from the tank adjacent one end thereof, and a gage for indicating the gasolene level in said tank, said gage comprising a gage body supported by the tank and having an indicator-controlling magnet, means actuated by the changes in gasolene level in said tank to control the position of the magnet, and a gage head separate and independent from the gage body and secured to the cowl-board, said head being provided with a pointer, the position of which is controlled by said magnet.

2. The combination with a tank, of a gage for indicating the liquid level in said tank, said gage comprising a head having an indicator and a body having indicator-controlling means which is actuated by the change in liquid level in said tank, said head being separate and independent from the body and without physical connection with said indicator-controlling means, means to secure said body to said tank with the indicator-controlling means thereof extending beyond the wall of the tank, and means separate and independent from the tank to support said head.

3. In a fluid gage, the combination with a gage head having an indicator mounted thereon, of a gage body separate and independent from said head and physically and mechanically unconnected thereto, magnetic indicator-controlling means sustained by said body and actuated by changes in the level of the liquid to be gaged, a tank, means for securing the gage body to the tank with the end thereof which supports the indicator-controlling means projecting through the wall of the tank, and means separate and independent from the tank for supporting the head.

4. In a fluid gage, the combination with a gage head having an indicator, of a gage body physically and mechanically unconnected to the head and provided with adjustable magnetic indicator-controlling means which is actuated by changes in level of the liquid to be gaged and is capable of adjustment toward and from the head, and independent means for supporting the head and gage, respectively.

5. The combination with a tank to contain liquid, of a fluid gage for indicating the liquid level in said tank, said gage comprising a gage body supported by said tank and having an indicator-controlling magnet, means actuated by the liquid level in said tank to control the position of the magnet, a gage head separate and independent from the gage body and provided with an indicating pointer, the position of which is controlled by the magnet, and means for adjusting the magnet toward and from the head.

In testimony whereof, I have signed my name to this specification, in the presence of two subscribing witnesses.

WILLIAM C. KNIGHT.

Witnesses:
Louis C. Smith,
George P. Gregory.